(12) United States Patent
Suzuki et al.

(10) Patent No.: US 6,509,662 B2
(45) Date of Patent: Jan. 21, 2003

(54) DC MOTOR

(75) Inventors: Akira Suzuki, Mori-machi (JP);
Yoshikazu Kurita, Mori-machi (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 09/683,529

(22) Filed: Jan. 15, 2002

(65) Prior Publication Data

US 2002/0113512 A1 Aug. 22, 2002

(30) Foreign Application Priority Data

Feb. 20, 2001 (JP) ........................................ 2001-042707

(51) Int. Cl.[7] ........................... H02K 21/26; H02K 49/10
(52) U.S. Cl. .................. 310/154.22; 310/152; 310/156; 310/67 R; 310/77
(58) Field of Search ................................ 310/154, 187, 310/216

(56) References Cited

U.S. PATENT DOCUMENTS

| | | | |
|---|---|---|---|
| 4,454,437 A | 6/1984 | Tanaka et al. | |
| 4,587,449 A | * 5/1986 | West | 310/154 |
| 4,774,426 A | 9/1988 | Mohr et al. | |
| 5,034,641 A | 7/1991 | Komuro et al. | |
| 5,095,238 A | * 3/1992 | Suzuki | 310/156 |
| 5,281,881 A | * 1/1994 | Geentry | 310/154 |
| 5,444,318 A | * 8/1995 | Stmpf | 310/77 |
| 5,698,921 A | * 12/1997 | Morimoto | 310/154 |
| 5,907,205 A | * 5/1999 | Herman | 310/152 |
| 6,179,894 B1 | * 1/2001 | Gay | 75/230 |

FOREIGN PATENT DOCUMENTS

| | | |
|---|---|---|
| EP | 0410127 | 1/1991 |
| GB | 2193385 | 2/1988 |
| JP | 58054861 | 3/1983 |

* cited by examiner

*Primary Examiner*—Tran Nguyen
*Assistant Examiner*—Iraj A Mohandesi
(74) *Attorney, Agent, or Firm*—Ernest A. Beutler

(57) ABSTRACT

A DC motor which is small in size and capable of effecting a higher output, and in which magnet size is determined through a parameter by which the peak output characteristic corresponding to the shape and size of the yoke can be recognized properly.

7 Claims, 6 Drawing Sheets

| tside diameter of yoke | A | | | B | | | C | | | D | | |
|---|---|---|---|---|---|---|---|---|---|---|---|---|
| | φ60 | | | φ60 | | | φ68 | | | φ68 | | |
| Space factor | 25(%) | | | 25(%) | | | 25(%) | | | 25(%) | | |
| Item | t (mm) | d/t | Pmax (W) | t (mm) | d/t | Pmax (W) | t (mm) | d/t | Pmax (W) | t (mm) | d/t | Pmax (W) |
| Material | neodymium | | | ferrite | | | neodymium | | | ferrite | | |
| Calculated value | 0.7 | 36.4 | 863 | 0.8 | 32.8 | 530 | 0.75 | 38.9 | 971 | 1.0 | 30.0 | 807 |
| | 1.0 | 25.2 | 875 | 1.0 | 26.0 | 541 | 1.0 | 28.9 | 980 | 2.0 | 14.5 | 844 |
| | 1.5 | 16.4 | 878 | 2.0 | 12.5 | 545 | 1.5 | 18.9 | 984 | 3.0 | 9.3 | 841 |
| | 2.0 | 12.1 | 872 | 3.0 | 8.0 | 531 | 2.0 | 14.0 | 982 | 4.0 | 6.7 | 823 |
| | 2.5 | 9.5 | 862 | 4.0 | 5.8 | 523 | 2.5 | 11.0 | 974 | 5.0 | 5.2 | 802 |
| | 3.0 | 7.7 | 850 | 5.0 | 4.4 | 503 | 3.0 | 9.0 | 967 | 6.0 | 4.2 | 771 |
| | | | | 6.0 | 3.5 | 480 | 4.0 | 6.5 | 944 | 7.0 | 3.4 | 739 |
| | | | | 7.0 | 2.9 | 448 | | | | 7.4 | 3.2 | 722 |
| | | | | 8.0 | 2.4 | 421 | | | | 8.0 | 2.9 | 696 |
| | | | | 9.0 | 2.0 | 378 | | | | 9.0 | 2.4 | 642 |
| | | | | | | | | | | 10.0 | 2.1 | 585 |

FIG. 3

| Outside diameter of yoke | A φ60 | | | B φ60 | | | C φ68 | | | D φ68 | | |
|---|---|---|---|---|---|---|---|---|---|---|---|---|
| Space factor | 22.9(%) | | | 20.2(%) | | | 31.5(%) | | | 26(%) | | |
| Material | neodymium | | | ferrite | | | neodymium | | | ferrite | | |
| Item | t (mm) | d/t | Pmax (W) | t (mm) | d/t | Pmax (W) | t (mm) | d/t | Pmax (W) | t (mm) | d/t | Pmax (W) |
| Calculated value | 0.7 | 36.4 | 843 | 0.8 | 32.8 | 488 | 0.75 | 38.9 | 1,002 | 1.0 | 30.0 | 816 |
| | 1.0 | 25.2 | 855 | 1.0 | 26.0 | 498 | 1.0 | 28.9 | 1,012 | 2.0 | 14.5 | 854 |
| | 1.5 | 16.4 | 856 | 2.0 | 12.5 | 495 | 1.5 | 18.9 | 1,019 | 3.0 | 9.3 | 853 |
| | 2.0 | 12.1 | 848 | 3.0 | 8.0 | 490 | 2.0 | 14.0 | 1,018 | 4.0 | 6.7 | 836 |
| | 2.5 | 9.5 | 810 | 4.0 | 5.8 | 479 | 2.5 | 11.0 | 1,014 | 5.0 | 5.2 | 812 |
| | 3.0 | 7.7 | 787 | 5.0 | 4.4 | 463 | 3.0 | 9.0 | 1,009 | 6.0 | 4.2 | 783 |
| | | | | 6.0 | 3.5 | 436 | 4.0 | 6.5 | 990 | 7.0 | 3.4 | 747 |
| | | | | 7.0 | 2.9 | 409 | | | | 7.4 | 3.2 | 732 |
| | | | | 8.0 | 2.4 | 372 | | | | 8.0 | 2.9 | 706 |
| | | | | 9.0 | 2.0 | 331 | | | | 9.0 | 2.4 | 659 |
| | | | | | | | | | | 10.0 | 2.1 | 598 |

FIG. 5

DC MOTOR

BACKGROUND OF INVENTION

This invention relates to a DC motor and more particularly to a compact, high output motor of this type.

Four-magnetic pole, four-brush, DC motors have been used in environments where a high output and small size is desirable such as a starter motor for a motorcycle. The four-magnetic pole, four-brush DC motor is one in which an armature constituting a rotor is journalled within a cylindrical yoke constituting a stator case. A commutator is provided at one end of the armature. Four arc-shaped magnets are attached on the inside wall of the stator case at regular intervals of 90° with adhesive. The magnets are generally made of a ferrite-base magnetic material (with magnetic flux density of about 0.4 T). A rotor shaft is journalled within the stator. Coils are wound on a core provided on the rotor shaft to form the armature.

The core is comprised of a plurality of radial core pieces, and a winding is wound around the core pieces in a given order to form the coils. The commutator is comprised of contact pieces corresponding to the core pieces of the coils, provided at one end of the rotor shaft. In contact with the commutator are four brushes, and rotation of the commutator allows the brushes to contact the contact pieces in turn so that the coils are energized to rotate the armature.

In a motorcycle the spatial constraints are large and size reduction of the starter motor is requisite. The thickness of the ferrite-base magnets constituting the stator of a conventional starter motor has been limited to about 5–6 mm from the technical viewpoint of manufacturing.

In addition, in order to enhance the ease of starting the motorcycle engine, improvement in the starter motor output is desirable. Improvement in starter motor output requires increased intensity of the magnetic field of magnets (magnetic flux density) to generate higher energy. To do this, it is necessary to allow a large current to flow on the coil side, corresponding to the higher energy caused by the higher magnetic flux density of the magnets. The large current requires a thick winding of the coils. Conventionally, the diameter of the wire of the winding is about 0.9 mm or less. This size is limited because of the structural requirements such as core shape, and the requirements of facilitating the winding operation.

The output can be increased by utilizing a neodymium-base magnet made of a magnetic material containing neodymium (Nd) or its compounds as a high energy magnet. The magnetic flux density of a neodymium-base magnet is about 1.2 T.

However, if the volume of the magnet is simply increased to enhance magnetic force in order to enhance the motor output, the magnet becomes thicker, and the diameter of the machine increases. This obviously contradicts the requirement of size reduction of the motor. Alternatively, if neodymium-base high energy magnets are used, a sufficient output increase corresponding to the magnet material cannot be effected if the diameter of the winding of the coils is limited to 0.9 mm.

If high energy magnets are used particularly in a starter motor for a motorcycle, the motor is required to have a limited size range. That mean that a simple increase in the magnet thickness necessitates a smaller armature due to the limited outside diameter, effecting no large output. In this case, even if the output characteristic is simply represented by the thickness or the volume of the magnet, or the outside diameter of the armature as a parameter, the characteristic of the peak output cannot be realized because the shape and size of the yoke can not be selected properly.

Therefore, the shape and size of the magnet has been determined, based only on convenience or costs of manufacturing, and there has been a lack of obtaining the optimum output characteristic.

Therefore it is a principal object of this invention to provide a DC motor which is small in size and capable of effecting a higher output.

This object is achieved by determining the magnet size through a parameter by which the peak output characteristic corresponding to the shape and size of the yoke can be recognized properly.

It is another object of this invention to provide a DC motor in which the output characteristic is based on a new parameter so that a size reduction and a high output can be effected.

SUMMARY OF INVENTION

This invention is adapted to be embodied in a DC motor comprised of a stator consisting of a plurality of arc-shaped magnets attached at circumferentially spaced, regular positions on an inside wall of a cylindrical yoke. A rotor shaft is journalled for rotation within the stator. An armature core is formed on the rotor shaft and is comprised of a plurality of radial core pieces and a winding wound around said core pieces to form the coils. The magnets are formed from a magnetic selected from a group of materials consisting of a magnetic material containing neodymium (Nd) and a ferrite-base magnetic material. The thickness of said magnets is represented by t and the outside diameter of said armature by d, the value of d/t is in the range of approximately 4–25.

In accordance with a further feature of the invention, the magnet material is a magnetic material containing neodymium (Nd) and the diameter of the winding is in the range of 1.0–2.5 mm and the value of d/t is in the range of approximately 8–25.

In accordance with another feature of the invention, the magnetic material is a ferrite-base magnetic material and the value of d/t is in the range of approximately 4–15 These relationships contrast with the prior art constructions where it has been found that in a conventional DC motor using ferrite-base magnets actual measurements of d/t of a conventional ferrite-base magnet DC motor for motorcycles is in the range of 2–3.

BRIEF DESCRIPTION OF DRAWINGS

FIG. 3 is a table of calculated values of the maximum output for motors in various conditions indicated as A, B, C and D.

FIG. 5 is a table in part similar to FIG. 3 of calculated values of the maximum output for motors in other various conditions.

DETAILED DESCRIPTION

Figure 1:
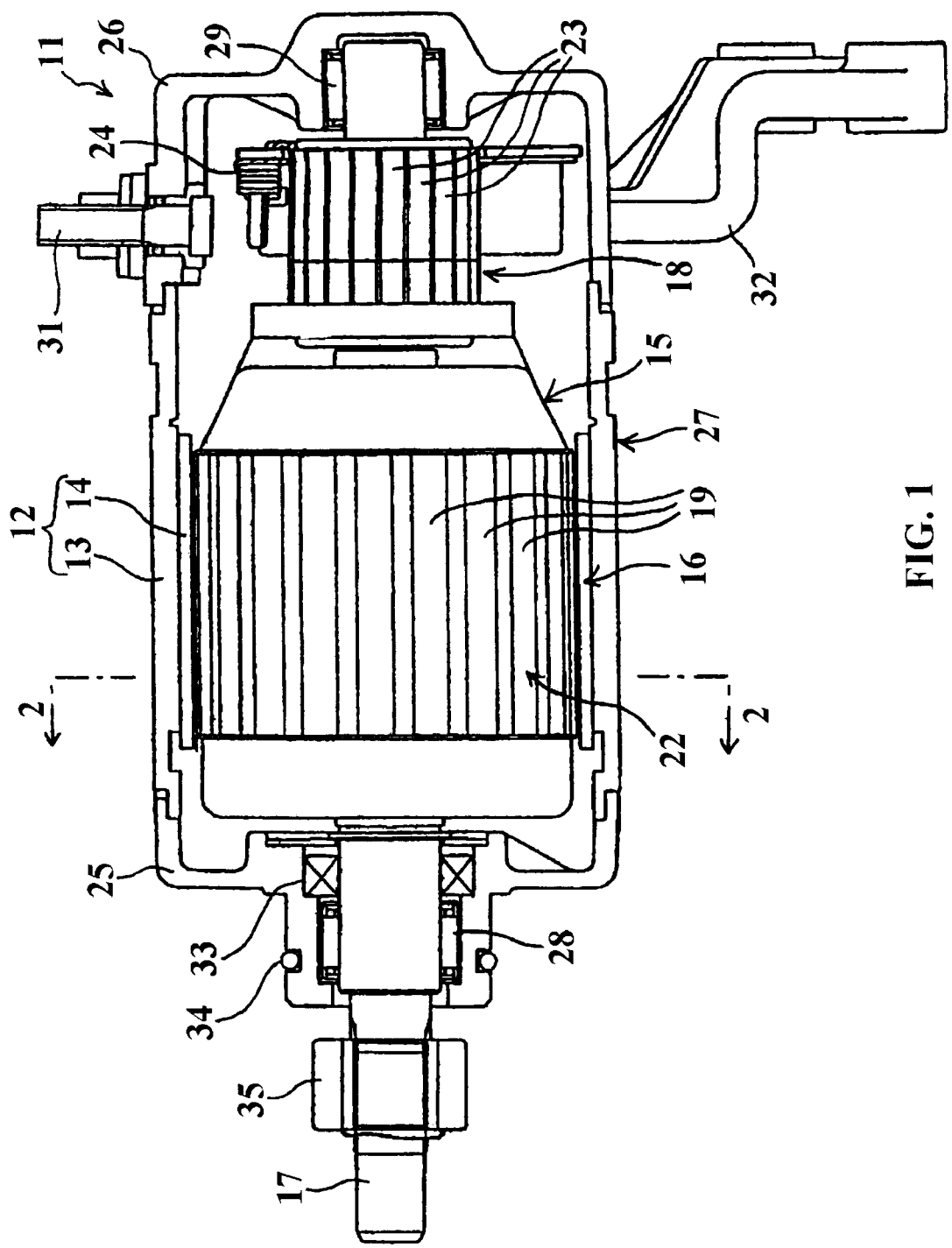
FIG. 1 is a general broken away side elevational view of a DC motor for use as a starter motor for motorcycles according to the invention.
Figure 2:
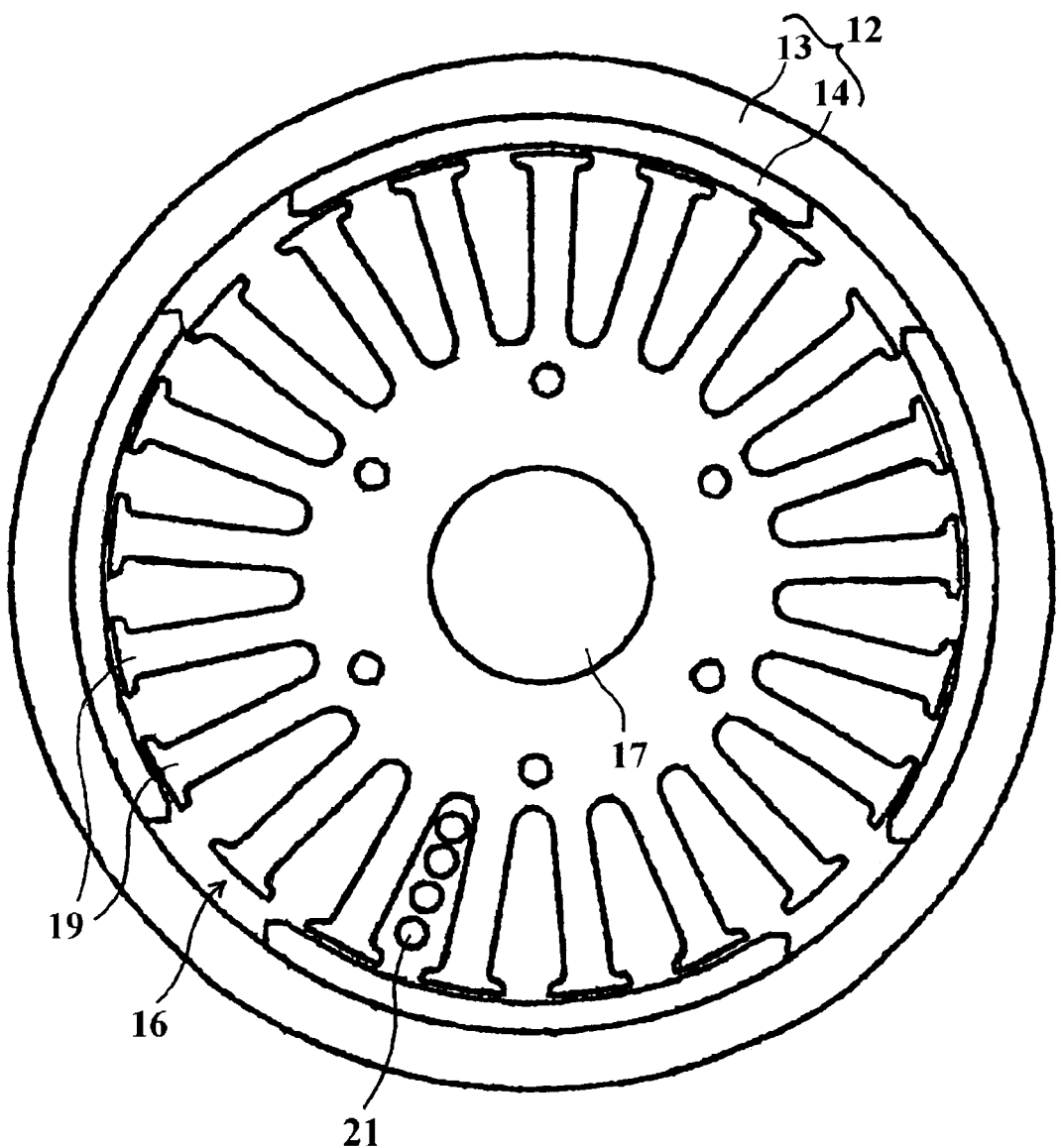
FIG. 2 is a sectional view taken along line 2—2 of FIG. 1.

Referring initially to FIGS. 1 and 2, a starter motor for a motorcycle is indicated generally by the reference numeral 11. The starter motor 11 is comprised of a stator, indicated generally at 12, having a cylindrical yoke 13, formed from a suitable material. Four permanent magnets 14 of an arc-shaped section are bonded at equal circumferential spacing on the inside surface of the yoke 13.

An armature or rotor 15 is journalled for rotation in the stator 12 in a manner to be described. The armature 15 is comprised of a core 16 facing the magnets 14 and mounted on a rotor shaft 17. A commutator 18 is mounted, adjacent to the core 16, on one end of the rotor shaft 17. The core 16, as shown in FIG. 2, comprises a plurality of radial core pieces 19, and an electrical conductor 21 is wound around the core pieces 19 to form coils 22. The commutator 18 comprises contact pieces 23 corresponding in numbers to the core pieces 19, and four or two brushes (not shown), depending on the way of winding, contact the commutator 18 from outside. The brushes are pressed against the contact pieces 23 of the commutator 18 by coil springs 24.

The outer housing of the motor 11 is completed by a pair of end covers 25 and 26 closing the ends of the cylindrical yoke 13. The end cover 25 (front cover) covers the side of the yoke 13 near the engine (not shown). The other end cover 26 forms a rear cover covering the right side of the yoke 13 respectively to complete a motor outer housing indicated as 27. The rotor shaft 17 is supported for rotation on the front and rear covers 25, 26 through bearings 28 and 29, respectively.

In the rear cover 26 are provided positive side terminals 31 for power supply from a battery (not shown) on the vehicle. The positive side terminals 31 are connected to the brushes (not shown) on the positive electrode side. The brushes (not shown) on the negative electrode side (earth side) are grounded through a mounting bracket 32 (or negative terminals) which may be formed integrally with the rear end cover 26.

The front cover 25 mounts an oil seal 33 for preventing ingress of oil from the engine side into the motor case 27 and an O-ring 34 for sealing the engine mounting portion. On the rotor shaft 17 at the engine side end is provided a gear 35 for drivingly rotating a crankshaft when engaged with a gear of an engine flywheel (not shown).

In assembling the starter motor 11 described above, first the winding 21 is wound around the core 16 on the rotor shaft 17 to form the coils 22, and then the commutator 18 is assembled to form the armature 15. On one end of the rotor shaft 17 is fitted the rear cover 26 so as to cover the commutator 18 side of the armature 15. To the rear cover 26 are attached the brushes (not shown), which are biased inwardly by the coil springs 24 as described above. Therefore, when the rear cover 26 is mounted to the end of the rotor shaft 17, it is fitted on the rotor shaft 17 with the brushes pushed outwardly from the commutator 18 against the action of the coil springs 24. After assembling the rear cover 26 to the armature 15 in this way, the cylindrical yoke 13 is fitted on the core 16 of the armature 15, and finally the front cover 25 is assembled.

In the starter motor 11 as described above, the magnets 14 are ferrite-base magnets, or high energy magnets containing neodymium (Nd) or its compounds. The magnetic flux density of the neodymium magnet is about 1.2 T. With such a high energy magnet, its thickness can be decreased, and an output of 700 W can be obtained with magnets of about 1.5 mm thickness. As a result, the outside diameter of the motor can be decreased, and the foregoing output of 700 W can be obtained by a motor of 60 mm diameter.

In the case of conventional ferrite-base magnets (with magnetic flux density of 0.4 T), an output of 700 W would require the magnet thickness of about 5 mm, and thus the outside diameter of the motor 11 will be increased to a size as large as 70 mm.

In this embodiment, in order to supply, to the coil 22, a large current corresponding to the high energy magnets, to obtain a higher output effectively, the diameter of the winding 21 is increased to about 1.0–2.5 mm, compared with that of a conventional winding of about 0.9 mm or less. With a winding having this thickness range, effective output corresponding to the high energy magnets can be obtained, and as shown in FIG. 2, the winding 21 can be wound smoothly around the core through the space between the core pieces 19.

As a result of the high energy magnets being used and the coils being formed from a thick winding, size reduction and a higher output of the motor can be effected by making effective use of reduced thickness and high magnetic flux density of the high energy magnets.

In such embodiments, when the thickness of the magnet 14 is represented by t and the outside diameter of the armature 15 by d, sizes of the magnet 14 and the armature 15 are determined such that d/t is in the range of 8–25 for neodymium-base magnets and 4–15 for ferrite-base magnets. The determination of the shape and size in this way by using d/t as a parameter, means that first, an output characteristic corresponding to d/t is found by experiments or calculations and then, the range of d/t for the peak output is determined from the output characteristic, as described below.

Figure 4A:
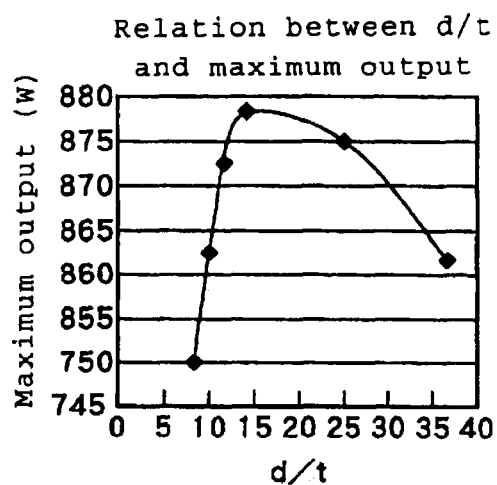
FIGS. 4A, B, C and D are graphs of the calculated values of FIG. 3 with d/t as a parameter.
Figure 4B:
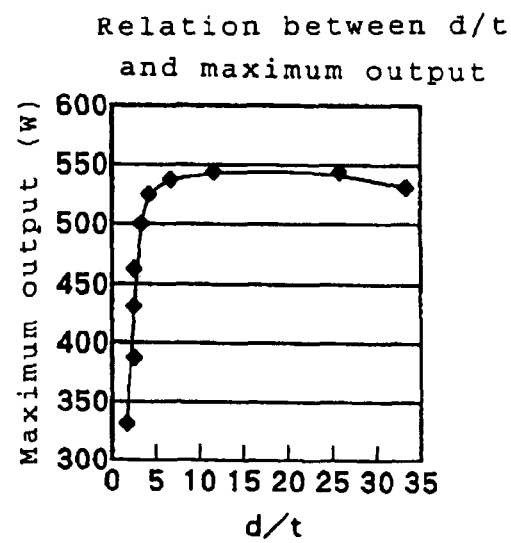
Figure 4C:
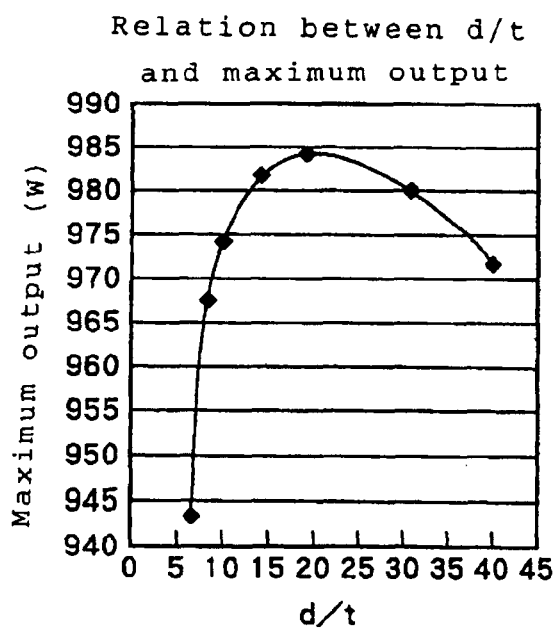
Figure 4D:
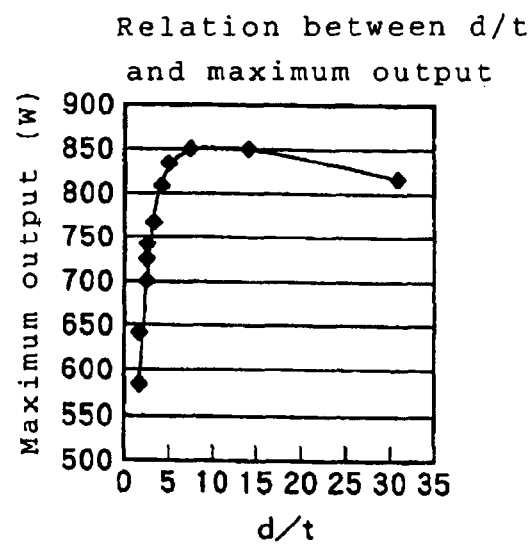

FIG. 3 shows a table of calculated values of the maximum output Pmax (W) with t and d/t for motors of yoke diameter 60 mm and 68 mm with neodymium-base and ferrite-base magnets, when the space factor is constant. FIGS. 4A, B, C and D shows graphs of the output characteristic (Pmax) with d/t as a parameter for the same motors described above. The space factor is a ratio of the sectional area occupied by a winding to the space area between core pieces in the core section.

As seen from these figures, both in the cases (B), (D) where ferrite-base magnets are used and in the cases (A), (C) where neodymium-base magnets are used, there is a range of d/t for a higher output. Also, as seen from FIGS. 4A, B, C and D, the peak value can easily be recognized from the graphs with d/t as a parameter particularly when neodymium magnets are used.

In the case of neodymium-base magnets, the thickness t is required to be 2 mm or more from the viewpoint of manufacturing. If a range for the maximum output is selected in view of this point, d/t is in the range of about 8–25.

In the case of ferrite-base magnets, the thickness t is conventionally required to be 6 mm or more for a yoke of 60 mm, and 5 mm or more for a yoke of 68 mm from the viewpoint of manufacturing of the magnets. Therefore d/t is in the range of 2–3, which is out of the range for a maximum output. However, in this embodiment, even if the thickness of the magnet is, for example, 5 mm or less, the range of d/t of 4–15 can be selected, thereby providing a small-sized and high-powered motor.

Figure 6A:
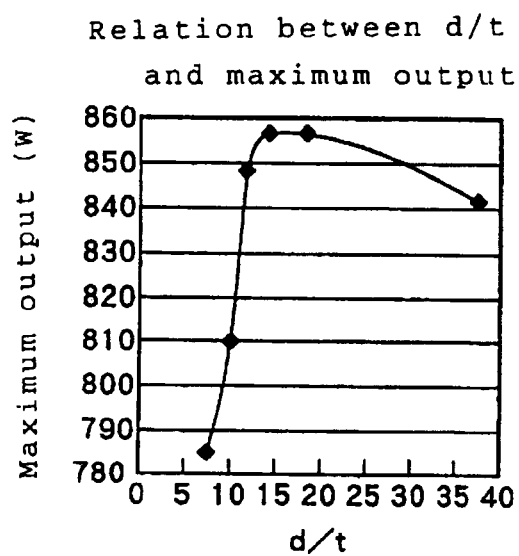
FIGS. 6A, B, C and D are graphs of calculated values of FIG. 5 with d/t as a parameter.
Figure 6B:
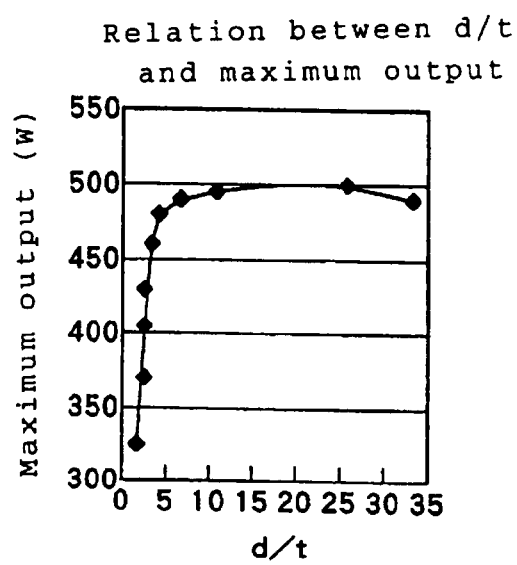
Figure 6C:
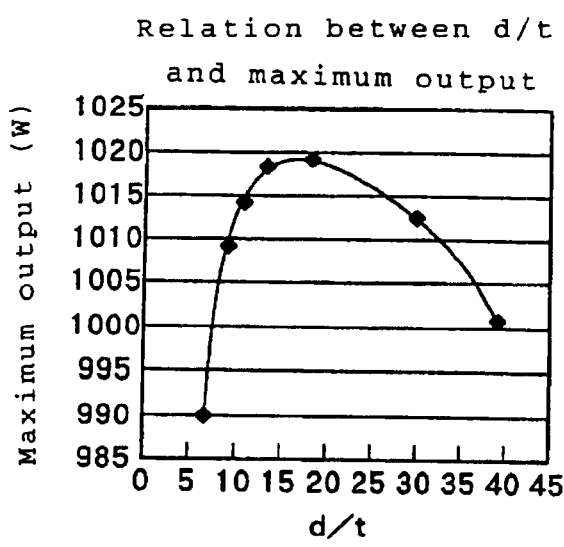
Figure 6D:
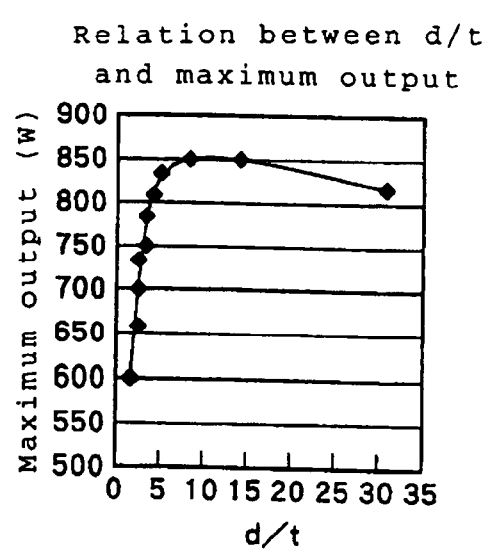

FIG. 5 shows a table of calculated values similar to FIG. 3 when the space factor is changed, and FIGS. 6A, B, C and D show graphs of the maximum output characteristic with the d/t as a parameter.

As seen from these figures, calculation results are the same as in FIG. 3 and FIG. 4A, B, C and D even when the space factor is changed, and both in the cases (B), (D) where ferrite-base magnets are used and in the cases (A), (C) where neodymium-base magnets are used, there is a range for a higher output. The range of d/t, as in FIG. 3 and FIG. 4A, B, C and D, is about 8–25 for neodymium-base magnets and 4–15 for ferrite-base magnets.

In this invention as described above, with a ratio d/t of the armature diameter d to the magnet thickness t as a parameter, an output characteristic is found by experiments or simulation calculations, and the range of d/t for a required large output is determined from the output characteristic, so that a high-powered motor can be obtained corresponding to the conditions of use such as shapes or purposes of the motor.

In particular, if the range of d/t is determined to be about 8–25 for neodymium-base magnets, a large output can be obtained efficiently by using high energy magnets, and a winding having a diameter allowing satisfactory utilization of this energy. In this case, a particularly remarkable effect can be produced if the diameter of the winding is in the range of 1.0–2.5 mm.

In the case of ferrite-base magnets, if the range of d/t is determined to be 4–15, a small-sized and high-powered motor can be obtained. In this case, if the thickness of the magnet is 6 mm or less, a higher output as well as sufficient size reduction can be effected.

If the motor is used particularly as a starter motor for motorcycles, a starter motor can be obtained which is capable of being disposed in a limited space, and small in size and high-powered. Of course the foregoing description is that of preferred embodiments but various changes or modifications may be made without departing from the spirit and scope of the invention, as defined by the appended claims.

What is claimed is:

1. A DC motor comprised of a stator consisting of a plurality of arc-shaped magnets attached at circumferentially spaced, regular positions on an inside wall of a cylindrical yoke, a rotor shaft journalled for rotation within in said stator, an armature core on said rotor shaft comprised of a plurality of radial core pieces and a winding wound around said core pieces to form coils, wherein said magnets are formed from a magnetic material selected from a group of materials consisting of a magnetic material containing neodymium Nd) and a ferrite-base magnetic material, wherein the thickness of said magnets is represented by t and the outside diameter of said armature by d, the value of d/t is in the range of approximately 4–25.

2. A DC motor as set forth in claim 1, wherein the diameter of the winding is in the range of 1.0–2.5 mm and the value of d/t is in the range of approximately 8–25.

3. A DC motor as set forth in claim 2, wherein the magnet material is a magnetic material containing neodymium (Nd).

4. A DC motor as set forth in claim 3, wherein the motor comprises a starter motor for a motorcycle and a starter gear is affixed to the rotor shaft.

5. A DC motor as set forth in claim 1, wherein the magnetic material is a ferrite-base magnetic material.

6. A DC motor as set forth in claim 5, wherein the value of d/t is in the range of approximately 4–15.

7. A DC motor as set forth in claim 6, wherein the motor comprises a starter motor for a motorcycle and a starter gear is affixed to the rotor shaft.

* * * * *